United States Patent [19]
Kawase et al.

[11] Patent Number: 5,889,555
[45] Date of Patent: Mar. 30, 1999

[54] VIDEO CAMERA SYSTEM AND OPTICAL ACCESSORY

[75] Inventors: Kazuhiko Kawase; Shigeo Nakashima, both of Yokohama, Japan

[73] Assignee: Canon Kabushiki Kaisha, Tokyo, Japan

[21] Appl. No.: 682,114

[22] Filed: Jul. 17, 1996

[30] Foreign Application Priority Data

Jul. 20, 1995 [JP] Japan .................................. 7-184230

[51] Int. Cl.⁶ ...................................................... H04N 9/07
[52] U.S. Cl. ........................... 348/336; 348/375; 396/532
[58] Field of Search .................................. 348/335, 336, 348/373, 375; 396/529, 531, 532

[56] References Cited

U.S. PATENT DOCUMENTS

| | | | |
|---|---|---|---|
| 4,457,609 | 7/1984 | Tomino | 396/532 |
| 5,021,812 | 6/1991 | Kohno | 396/532 |
| 5,041,858 | 8/1991 | Yamamichi | 396/532 |
| 5,436,661 | 7/1995 | Yamamoto | 348/264 |
| 5,561,462 | 10/1996 | Nagano | 348/375 |

*Primary Examiner*—Bryan Tung
*Attorney, Agent, or Firm*—Robin, Blecker & Daley

[57] ABSTRACT

A video camera system includes a camera body having a camera electrical connecting terminal which performs at least a communication, a camera mount, a color separation prism, and a plurality of imaging elements, and an optical accessory having an accessory mount which is attachable/detachable to/from the camera mount of the camera body, and having an accessory electrical connecting terminal which is connected with the camera electrical connecting terminal when the optical accessory is attached. The camera electrical connecting terminal is disposed at least at one side position of the direction of the color separation axis where is at the rear of a flange plane of the camera mount along the optical axis and is substantially the same as the direction of the color separation axis of the color separation prism.

12 Claims, 8 Drawing Sheets

VIDEO CAMERA SYSTEM AND OPTICAL ACCESSORY

BACKGROUND OF THE INVENTION

1. Field of the Invention

The present invention relates to a video camera system in which both a camera body and an optical accessory have connecting terminals for electrical connections, or an optical accessory.

2. Related Background Art

Conventionally, in multiple-plate type video cameras using color separation prisms, a lens exchangeable video camera system which allows optical accessories or accessories such as exchangeable lenses, various kinds of converters, and the like to be freely attached/detached by adopting a bayonet mount, is known.

In such video camera system, an electrical connection is normally attained outside a mount using a cable and connectors attached to the ends of the cable as power supply or communication means from a camera body to an optical accessory. In recent years, another type of mount has been proposed. With this mount, electrical connecting terminals are arranged on flange portions of mounts of the camera body and the optical accessory, and an electrical connection between the two mounts can be attained simultaneously with the mechanical mounting of them.

However, in the prior art, since the electrical connecting terminal is disposed on the flange portion of each mount, the width of the flange portion must be increased, resulting in a mount with a large outer diameter and a large weight.

On the other hand, the mount and its flange portion consist of a hard metal for the purpose of suppressing wear as much as possible. For this reason, a machining process for arranging the electrical connecting terminal on such portion requires high cost.

Furthermore, since a user can relatively easily touch the contacts of the electrical connecting terminal arranged on the flange portion of the mount when the optical accessory is detached from the camera body, a short-circuiting accident between terminals due to a metal piece such as a coin, a contact error due to dust, or the like readily occurs.

A multiple-plate type video camera tends to have a long back focus since a color separation prism must be disposed. When the electrical connecting terminal is arranged on such camera, the back focus is further prolonged, resulting in a large, heavy camera.

SUMMARY OF THE INVENTION

One aspect of the invention is to provide a video camera system which comprises a multiple-plate type camera body having a camera electrical connecting terminal which performs at least a communication, a camera mount, and a color separation prism, and an optical accessory having an accessory mount which is attachable/detachable to/from the camera mount of the camera body, and an accessory electrical connecting terminal which is connected to the camera electrical connecting terminal when the optical accessory is attached, wherein the camera electrical connecting terminal is disposed at least at one side position, which is at the rear of a flange surface of the camera mount along the optical axis, in a direction which is substantially the same as the direction of a color separation axis of the color separation prism.

DETAILED DESCRIPTION OF THE PREFERRED EMBODIMENT

Figure 1:
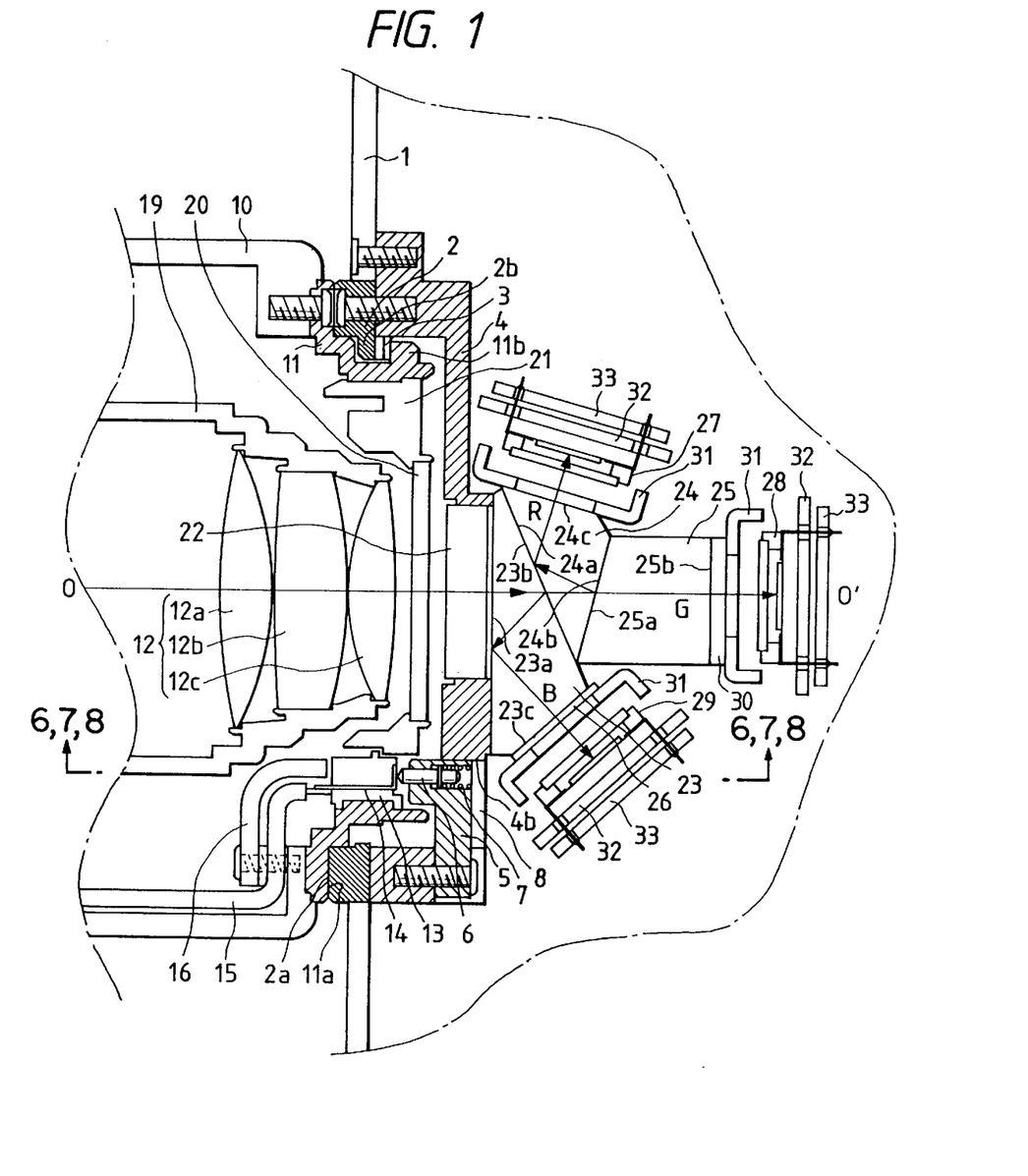
FIG. 1 is a side sectional view showing a state wherein an exchangeable lens is mounted on a video camera body according to an embodiment of the present invention.
Figure 2:
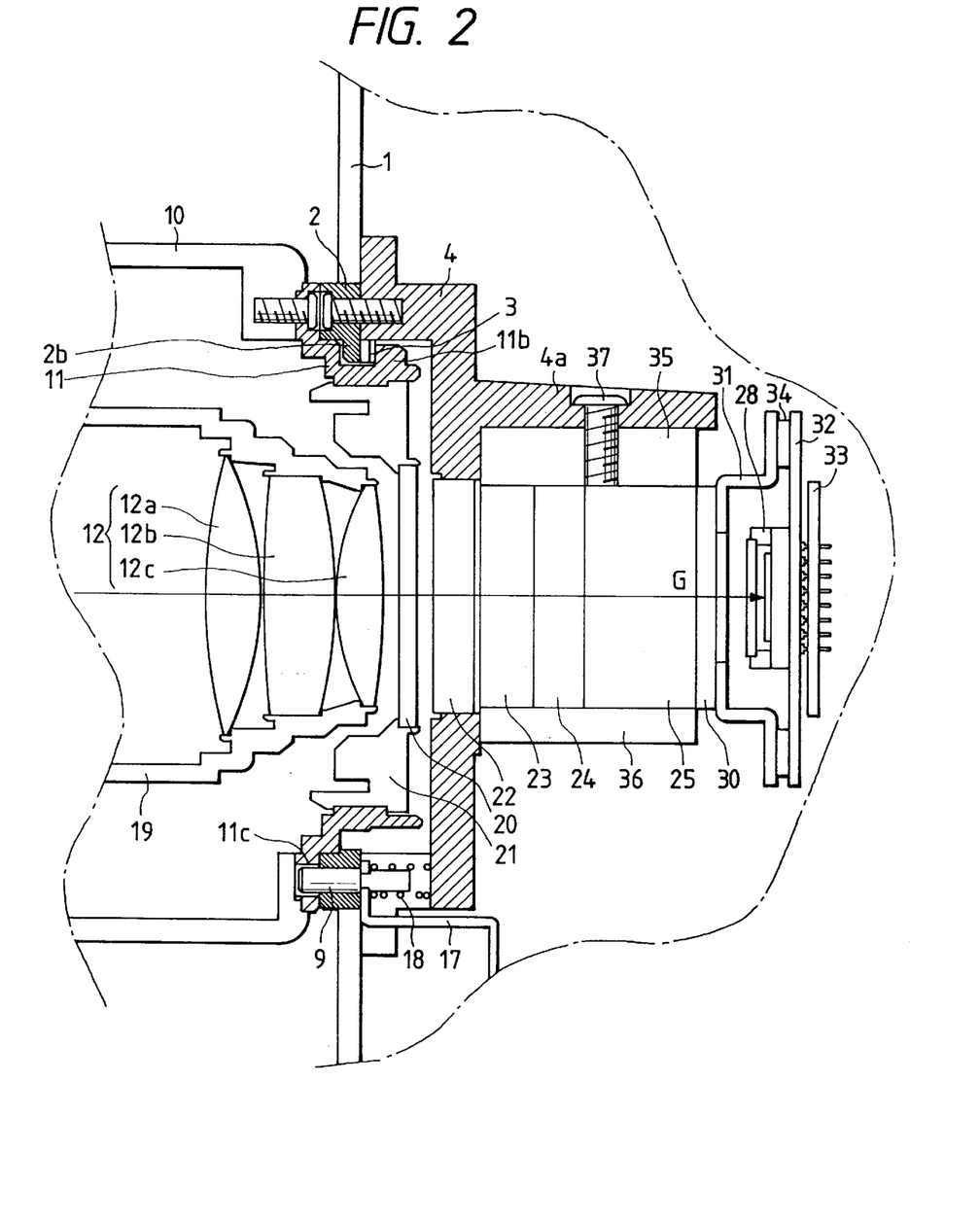
FIG. 2 is a plan sectional view showing the state wherein the exchangeable lens is mounted on the video camera body according to an embodiment of the present invention.
Figure 3:
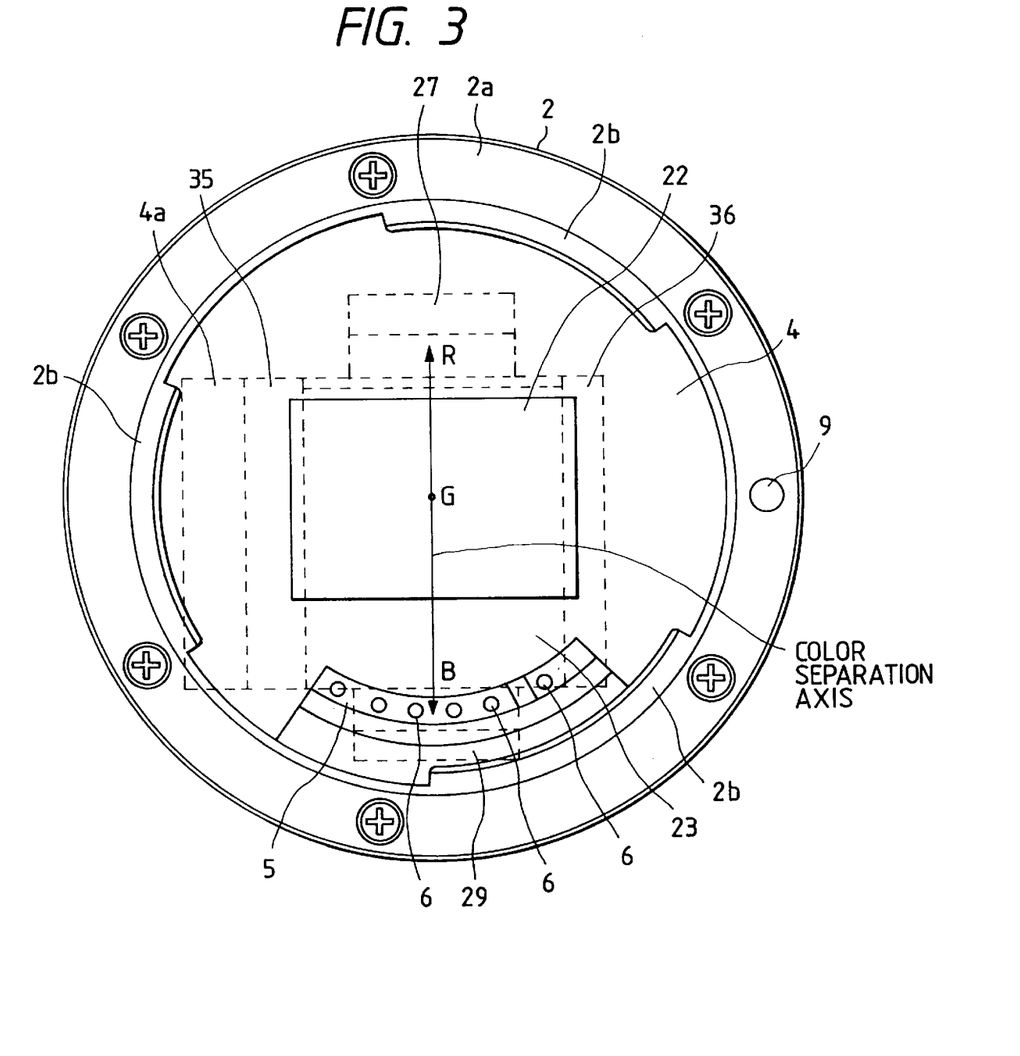
FIG. 3 is a plan view of a camera mount portion shown in FIG. 1 when viewed from the lens side.
Figure 4:
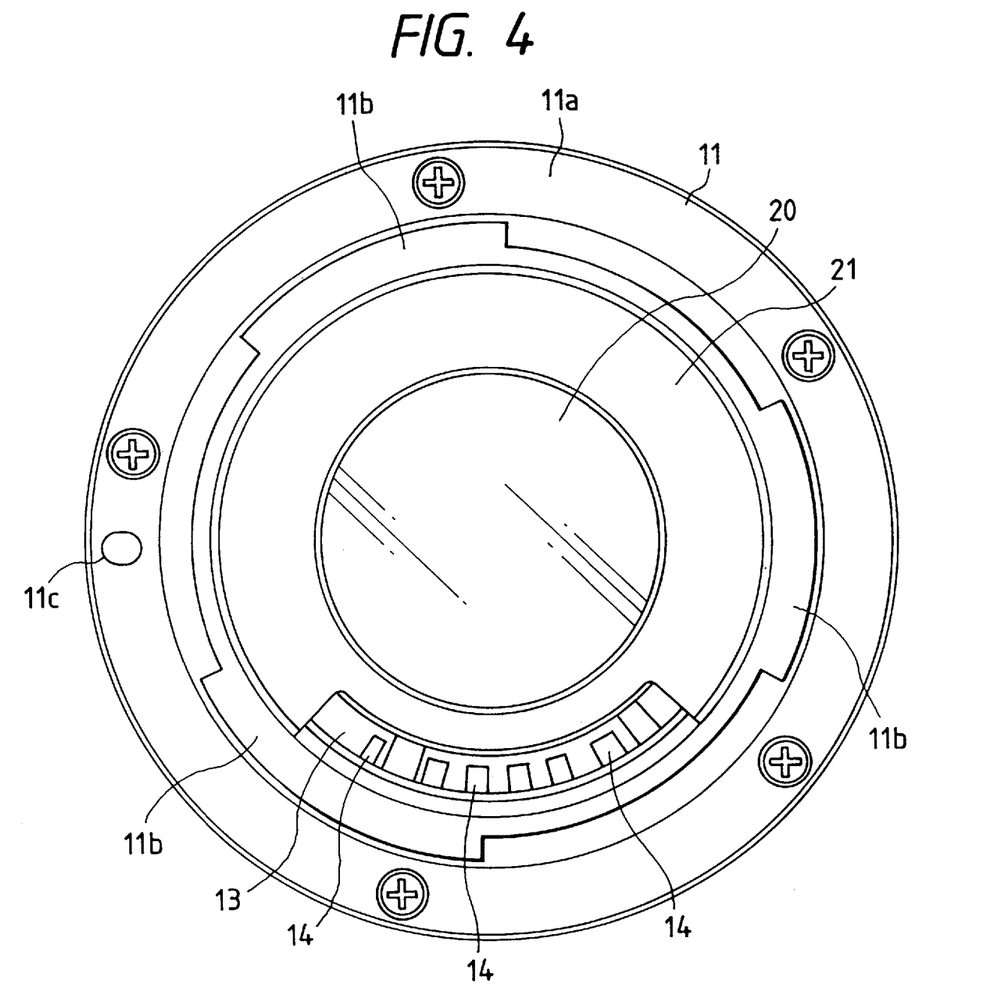
FIG. 4 is a plan view of a lens mount shown in FIG. 1 when viewed from the camera side.

FIGS. 1 to 4 show an embodiment of the present invention. FIG. 1 is a side sectional view showing a state wherein an exchangeable lens is mounted on a video camera body, FIG. 2 is a plan sectional view showing the state wherein the exchangeable lens is mounted on the video camera body (when an O–O' section in FIG. 1 is viewed from the above), FIG. 3 is a plan view of a camera mount portion shown in FIG. 1 when viewed from the lens side, and FIG. 4 is a plan view of a lens mount shown in FIG. 1 when viewed from the camera side.

Referring to FIGS. 1 to 4, a bayonet mount type camera mount 2 that allows pivotal accessory attachment/detachment is fixed to a video camera body 1, and is formed with a flange surface 2a serving as a reference in the optical axis direction, and three mount pawls 2b. A leaf spring 3 contacts a mount pawl 11b of a lens mount 11 (to be described later), so that the mount flange surfaces of both the camera mount 2 and the lens mount 11 are in tight contact with each other. A color separation prism unit (to be described later) is fixed by screws to a prism holder 4. Camera contacts 6 serving as an electrical connecting terminal are supported by a camera contact base 5 to be movable in an optical axis direction O–O' as a contact direction. Conductive springs 7 elastically bias the camera contacts 7 in the contact direction. A printed circuit board 8 is electrically connected to the camera contacts 6 via the springs 7, and is formed with a conductive pattern at a position corresponding to the camera contacts 6. A lock pin 9 is always biased by a lock spring 18 to a position where it protrudes from the mount flange surface 2a, and can be arbitrarily moved by a lock lever 17 to a position where it is retracted from the mount flange surface 2a, thus allowing locking and unlocking operations upon mounting of the lens mount. A bayonet mount type lens mount 11 that allows pivotal accessory attachment/detachment is fixed to an outer lens barrel 10 of an exchangeable lens as an optical accessory (also includes various kinds of extenders, intermediate tubes, and the like in addition to exchangeable lenses). The lens mount 11 is formed with a mount flange surface 11a serving as a reference in the optical axis direction, three mount pawls 11b, and a lock groove 11c that receives the lock pin 9 to lock the mounts. A lens group (e.g., a focus lens group) 12 includes three lenses 12a, 12b, and 12c and is movable in the optical axis direction. Lens contacts 14 serving as an electrical connecting terminal are fixed by, e.g., insert molding, to a lens contact base 13, and are disposed to be in contact with the camera contacts 6 upon pivotal mounting of the two mounts 2 and 11. Lead lines 15 are soldered to the lens contacts, and are protected by a contact portion cover 16. The movable lens group 12 is held by a movable lens barrel 19. A protection glass 20 is held by a protection glass holder 21, and protects the movable lens group 12 as a movable portion from being directly touched when the exchangeable lens is detached from the camera body.

The camera body 1 includes an optical low-pass filter 22 for limiting high-frequency components of light entering first, second, and third prisms 23, 24, and 25, a blue range light trimming filter 26, CCDs 27, 28, and 29 as imaging elements, a green range light trimming filter 30, a CCD mounting plate 31, a CCD mounting plate 32, a CCD printed circuit board 33, a CCD fixing member 34, a first prism holding plate 35, and a second prism holding plate 36.

Referring to FIG. 1, a light beam passing through the movable lens group 12, the protection glass 20, and the optical low-pass filter 22 is incident on an incident plane 23a of the first prism 23, which is disposed in a direction perpendicular to the optical axis of the light beam. The prism 23 reflects blue range light by a blue range light reflection dichroic layer 23b formed on a reflection surface that forms a slanted plane with the optical axis of the incident light beam, and transmits other wavelength range light components.

In the second prism 24, the other wavelength range light components transmitted through the first prism 23 are incident on an incident plane 24a. The prism 24 reflects red range light by a red range light reflection dichroic layer 24b formed on a reflection surface, and transmits green range light.

In the third prism 25, the green range light is incident on an incident plane 25a and exits from an exit plane 25b.

With these three prisms, a light beam coming from an object is separated into three colors in the up-and-down direction. In this embodiment, the color separation axis direction corresponds to the up-and-down direction in FIG. 1.

The blue range light reflected by the blue range light reflection dichroic layer 23b of the first prism 23 as described above is totally reflected by the incident plane 23a of the first prism 23, and is incident on the CCD 29 as an imaging element via the blue range light trimming filter 26 joined to an exit surface 23c of the first prism 23, thus forming an image thereon. The blue range light trimming filter 26 consists of color glass that absorbs green range light and red range light.

An air layer having a uniform thickness of 10 to 30 μm is formed between the first and second prisms 23 and 24. With this air layer, light transmitted through the first prism 23 and incident on the second prism 24 is not disturbed at all, and red range light reflected by the dichroic layer 24b of the second prism 24 can be reliably totally reflected by the incident plane 24a of the second prism.

The red range light, which is transmitted through the blue range reflection dichroic layer 23b of the first prism 23 and is reflected by the red range light reflection dichroic layer 24b of the second prism 24 is incident on the CCD 27 as an imaging element via an exit plane 24c of the second prism 24, thus forming an image thereon.

In this manner, the green range light which is transmitted through the blue range light reflection dichroic layer 23b of the first prism 23 and the red range light reflection dichroic layer 24b of the second prism 24 is incident on the CCD 28 as an imaging element via the green range light trimming filter 30 joined to the exit plane 25b of the third prism 25, thus forming an image thereon.

CCD 27, CCD mounting plate 31, CCD mounting plate 32, CCD printed circuit board and CCD fixing member 34 comprise a first imaging device. CCD 28, CCD mounting plate 31, CCD mounting plate 32, CCD printed circuit board and CCD fixing member 34 comprise a second imaging device. CCD 29, CCD mounting plate 31, CCD mounting plate 32, CCD printed circuit board and CCD fixing member 34 comprise a third imaging device.

As shown in FIG. 2, the CCD 28 as the imaging element is positioned and mounted with respect to the optical axis by the CCD fixing member 34, which consists of, e.g., solder, and fixes the first CCD mounting plate 31 joined to the green range light trimming filter 30 and the second CCD mounting plate 32 joined to the CCD 28 as the imaging element. The same applies to the CCDs 27 and 29 as the imaging elements.

The prisms 23, 24, and 25 constitute a prism unit when they are joined by the first and second prism holding plates 35 and 36 consisting of, e.g., ceramics from the two sides in the right-and-left direction with respect to the optical axis, i.e., in a direction perpendicular to the color separation axis direction, thus forming a slanted plane for color separation and an air layer of a uniform thickness. The prism holding plate 36 is formed with a female screw used for fixing by, e.g., insert molding, and is fixed by a set screw 37 to an arm 4a of the prism holder 4.

In the case of a video camera having a color separation prism and a plurality of imaging elements, the distance from the mount flange surface to the focal plane, i.e., a so-called flange back must be set to be relatively large so as to assure an optical path in which the prism is inserted. In this case, as the flange back becomes larger, the optical system of an exchangeable lens becomes larger in size. Therefore, a layout that can decrease the flange back as much as possible within the storage range of the prism is required. On the other hand, in order to prevent the camera contacts 6 from being inadvertently touched by a user when the exchangeable lens is detached, the camera contacts 6 must be disposed at positions sufficiently deeper than the mount flange surface 2a in the optical axis direction. Therefore, a layout that can set the camera contacts 6 and the prism unit to be closest to each other in the optical axis direction is required.

As shown in FIG. 1, the camera contact base 5 which supports the camera contacts 6 is mounted to be housed in a notched portion 4b of the prism holder 4. However, as shown in FIG. 2, since the structure of the prism holder 4 must have the arm 4a for fixing and holding the prism unit by the screw in at least one of the right-and-left directions (up-and-down directions in FIG. 2) of the optical axis, i.e., directions perpendicular to the color separation axis direction of the prisms, it is difficult to form the notched portion 4b for housing the camera contact base 5 in the prism holder 4 in this direction.

Based on this difficulty, the present inventors determined that it is proper to form the notched portion 4b in the color separation axis direction (the up-and-down direction in FIG. 1 in this embodiment) of the prisms to mount the camera contact base 5. As shown in FIG. 1, since the blue and red range light beams have different color separation positions and angles in the up-and-down direction in this embodiment, the CCDs 27 and 29 have different mounting positions and angles in the optical axis direction.

In this embodiment, since the CCD 29 for the blue range light is located at a position that recedes backward along the optical axis as compared to that of the CCD 27 for the red range light, the shortest flange back can be set while assuring a sufficient depth from the mount flange surface 2*a* to the camera contacts 6 by disposing the camera contact base 5 and the camera contacts 6 in that direction, i.e., on the lower side.

A large number of kinds of color separation methods and prisms therefor in video cameras suitable for this embodiment have been proposed. The focusing positions of light components separated in different directions do not become equal positions in the optical axis direction in most cases. Therefore, even when color separation prisms other than those used in the above-mentioned arrangement of this embodiment are used, if the camera contact base and contacts are disposed selectively on one side in the color separation axis direction, an effect equivalent to that of this embodiment can be obtained. If there are sufficient camera contact layout spaces on the two sides in the color separation axis direction, an arrangement in which two sets of camera contact bases and contacts are disposed on the two sides is also available.

It is normally advantageous in terms of space to separate the color separation axis direction of a color separation prism in a video camera in the up-and-down direction in association with the aspect ratio of the screen. However, as shown in FIG. 3, when the camera contacts 6 are disposed on one of the upper and lower sides (FIG. 3 exemplifies a case wherein the contacts 6 are disposed in the lower direction), the contacts 6 are disposed at a position separated farthest from a light beam passing through the optical low-pass filter 22, and consequently, they are located at a position where the influence of ghost due to light reflected by the camera contacts 6 hardly appears. In particular, it is very effective to dispose the contacts 6 at such position in a wide-aspect screen (16:9) that has become popular in recent years.

Figure 5:
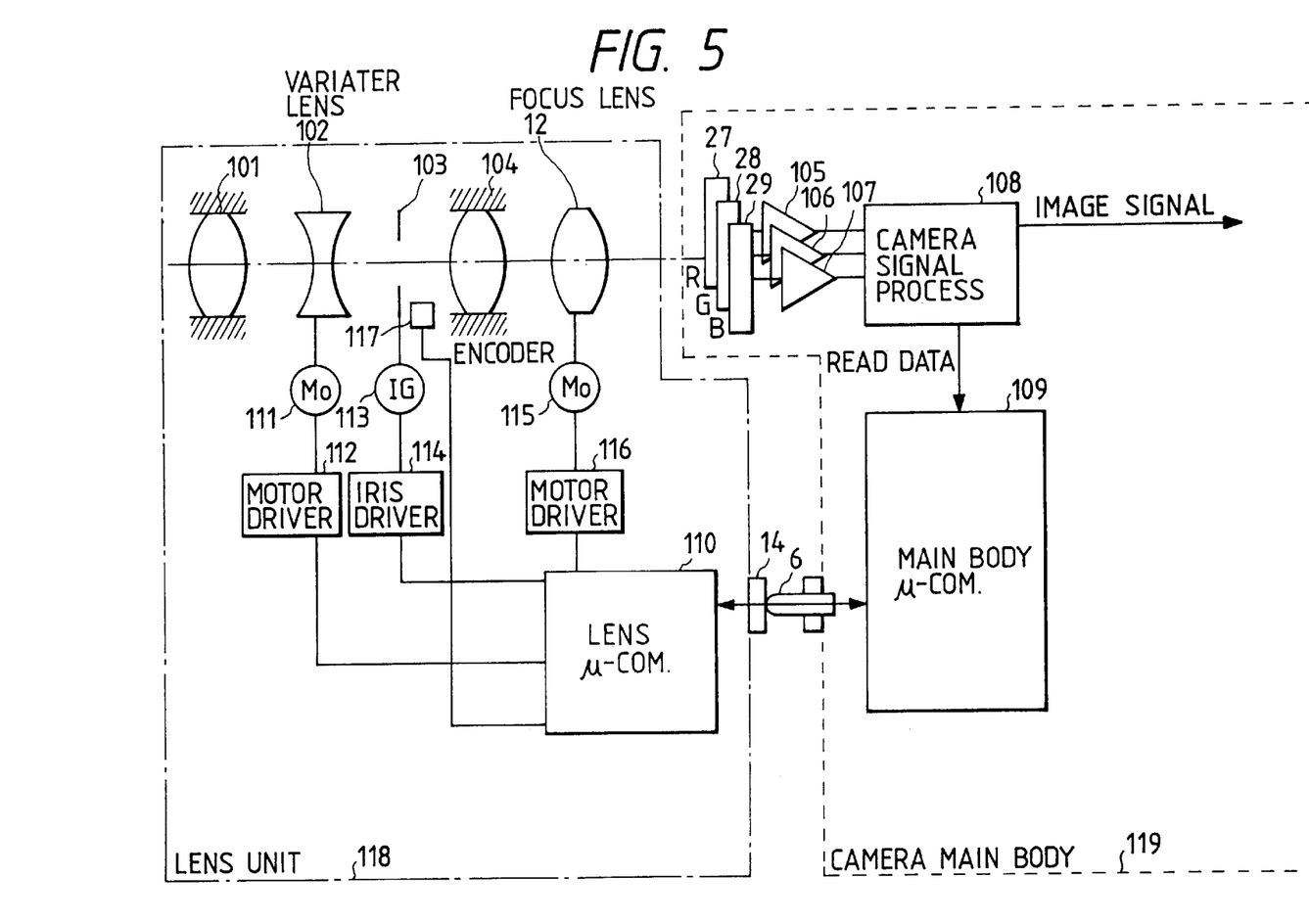
FIG. 5 is a block diagram showing the overall arrangement of the embodiment of the present invention.

The circuit arrangement of the lens exchangeable video camera according to this embodiment will be described below with reference to FIG. 5. FIG. 5 is a block diagram showing the arrangement of the embodiment of the present invention. In the following description, an embodiment of a zoom lens which consists of four lens groups in the order of convex, concave, convex, and convex lens groups from the object side and is most popular in a video camera will be exemplified.

Light from an object is transmitted through a fixed first lens group 101, a variater lens group 102 as a second lens group for attaining zooming, an iris 103, a fixed third lens group 104, and a focus lens group 12 having both a focusing function and a compensator function for compensating for shifts of the focal plane due to zooming. Then, of three primary colors, the red light component forms an image on the CCD 27, the green light component forms an image on the CCD 28, and the blue light component forms an image on the CCDs 29. The respective color images on the CCDs are photoelectrically converted into electrical signals, which are amplified by amplifiers 105, 106, and 107 to appropriate levels. The amplified signals are input to a camera signal processing circuit 108, and are converted into a standard television signal. At the same time, the signals input to the processing circuit 108 are also read out as AF (automatic focusing) information and AE (automatic exposure) information by a main body microcomputer (μ-com.) 109.

The AF information and AE information read out by the main body μ-com. 109 are transferred to a lens μ-com. 110 via the camera contacts 6 and the lens contacts 14 together with information of camera switches that represent, e.g., the ON/OFF state of an AF switch, the state of a zoom switch, and the like.

When the lens μ-com. 110 determines based on the ON/OFF state of the AF switch and the AF information sent from the main body μ-com. 109 that the AF switch is ON, it executes a motor control program based on the AF information and supplies a motor driving signal to a focus motor driver 116.

The focus motor driver 116 drives a focus motor 115 on the basis of the signal from the lens μ-com. 110 to move the focus lens group 12 in the optical axis direction, thus attaining focusing.

When an operation based on the information indicating the state of the zoom switch sent from the main body μ-com. 109 is also required, the lens μ-com. 110 supplies driving signals to a zoom motor driver 112 and the focus motor driver 116 to perform an operation for maintaining the focal plane during zooming on the basis of the position data of the variater lens group 102 and the focus lens group 12 for maintaining an in-focus state in correspondence with the object distance, which data are stored in the lens μ-com. 110.

The zoom and focus motor drivers 112 and 116 respectively drive a zoom motor 111 and the focus motor 115 on the basis of the signals from the lens μ-com. 110 to move the variater lens group 102 and the focus lens group 12 in the optical axis direction, thus attaining a zoom operation without shifting the focusing position.

Furthermore, the lens μ-com. 110 supplies a signal for obtaining an appropriate exposure to an iris driver 114 on the basis of the AE information sent from the main body μ-com. 109 and information from an encoder 117 for detecting the iris state. The iris driver 114 drives an iris actuator 113 on the basis of the signal from the lens μ-com. 110 to control the aperture size of the iris 103 so as to provide an appropriate exposure.

As described above, since the camera and lens contacts 6 and 14 are arranged to be detachable from the two microcomputers, i.e., the camera main body μ-com. 109 and the lens μ-com. 110 and the communication path of these microcomputers, a lens unit 118 can be freely attached/detached to/from a camera main body 119, and the AF, AE, and zoom operations can be reliably performed as in a general video camera in which a lens and a camera are integrated.

Figure 6:
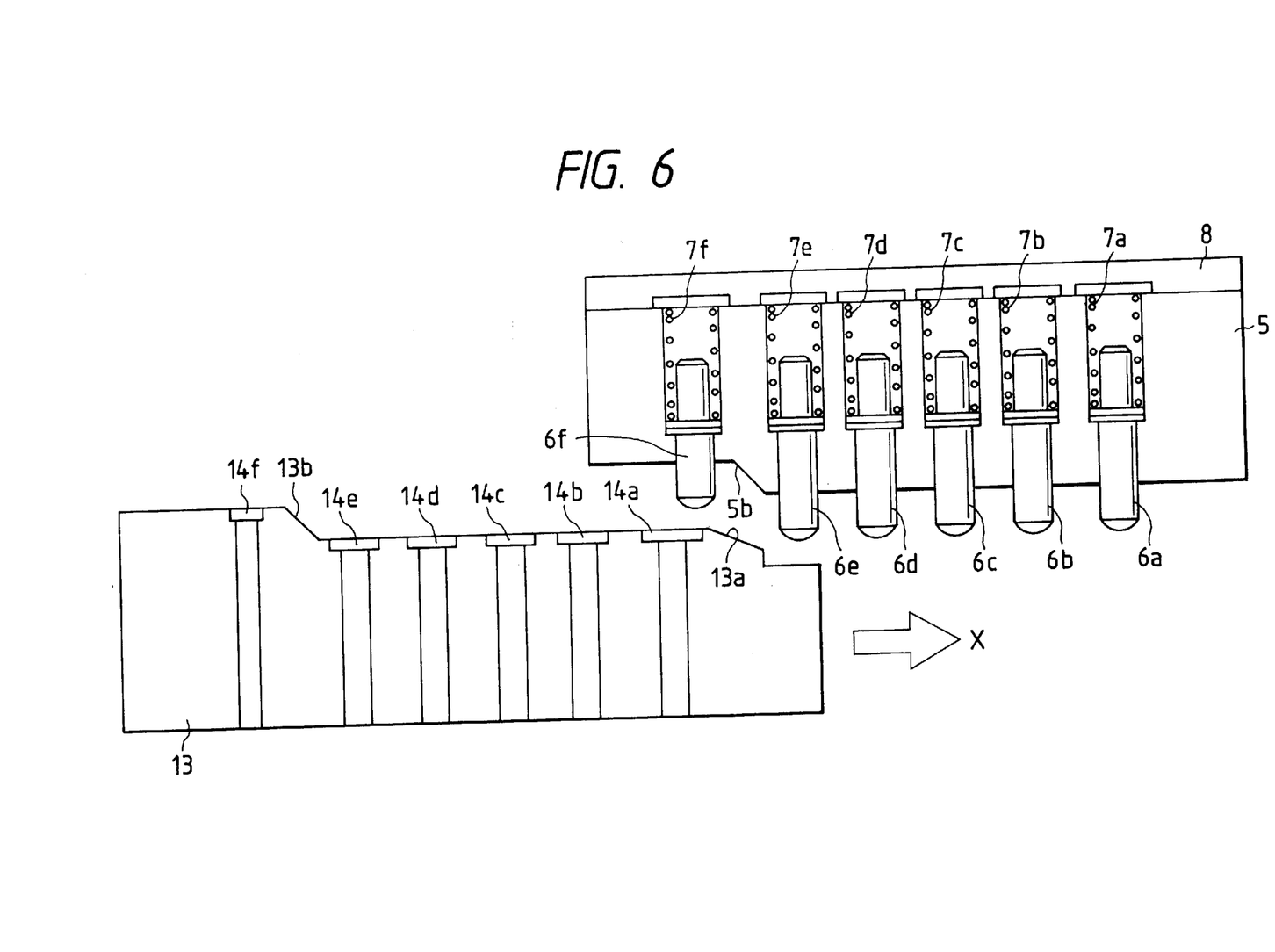
FIG. 6 is an enlarged sectional view of a principal part taken along a line A—A in FIG. 1 to explain the mounting pivotal motion of the mounts.
Figure 7:
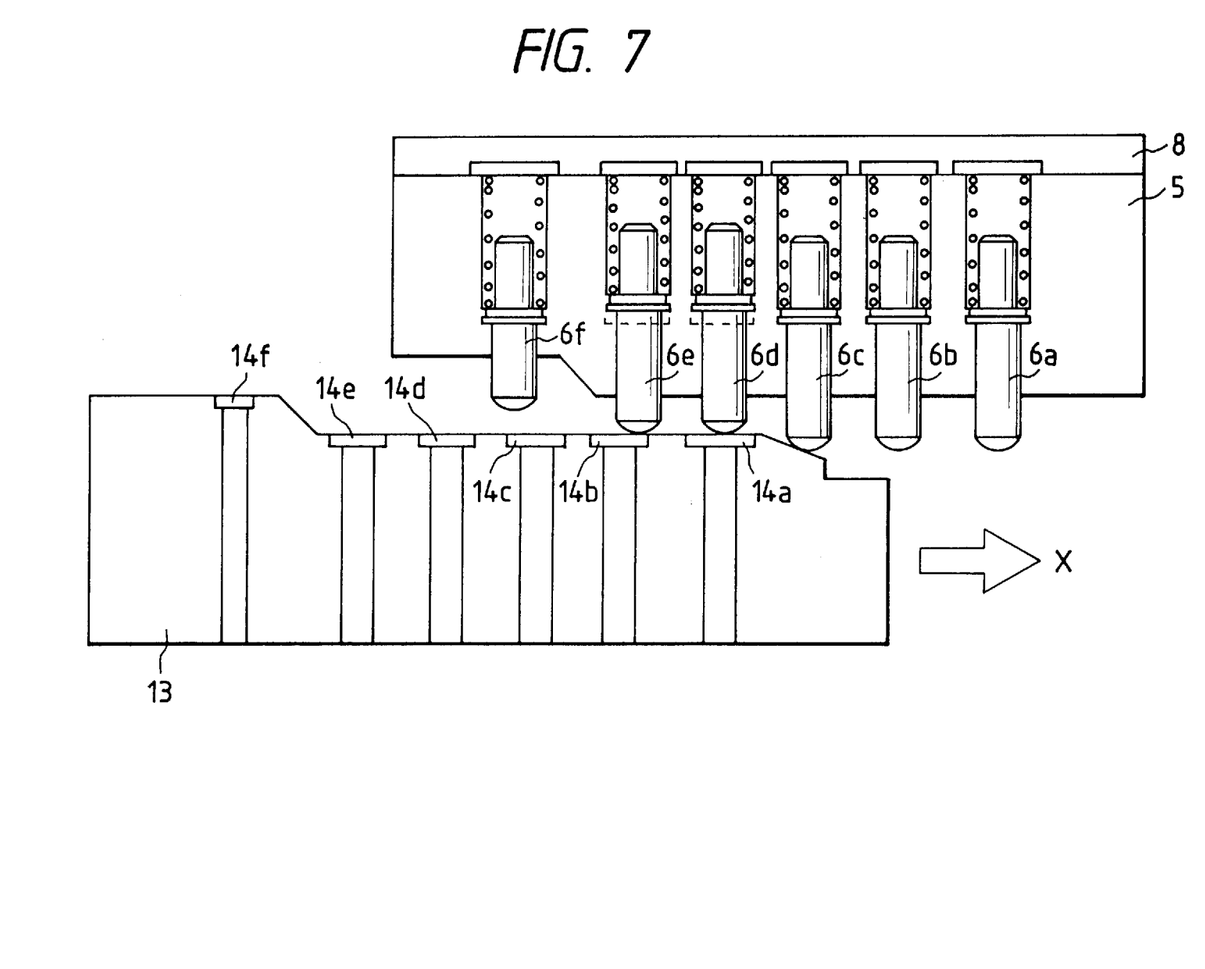
FIG. 7 is an enlarged sectional view of a principal part taken along the line A—A in FIG. 1 to explain the mounting pivotal motion of the mounts.
Figure 8:
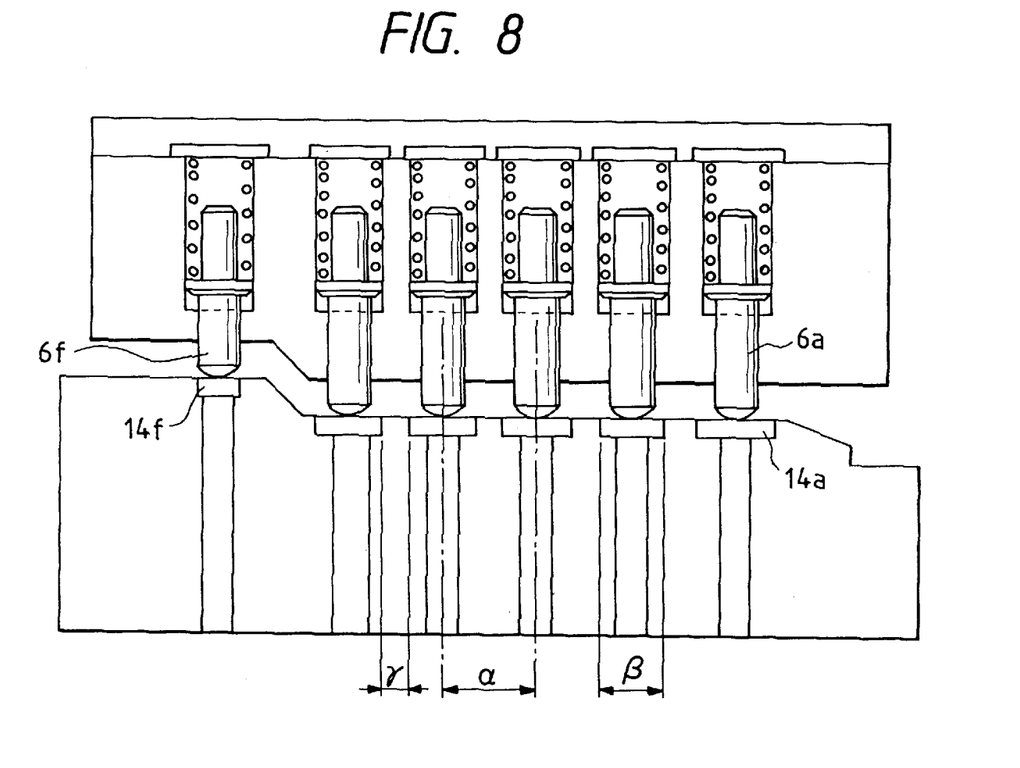
FIG. 8 is an enlarged sectional view of a principal part taken along the line A—A in FIG. 1 to explain the mounting pivotal motion of the mounts.

The detailed features and the mounting operation of the contact portions of this embodiment will be described below with reference to FIGS. 6 to 8. FIGS. 6 to 8 are enlarged sectional views of principal part taken along a line A—A in FIG. 1 to explain the mounting pivotal motion of the mounts.

Referring to FIGS. 6 to 8, a total of six contacts, i.e., camera contacts 6*a* to 6*f* serving as an electrical connecting terminal, are supported on the camera contact base 5 to be movable in the optical axis direction as the contact direction. A total of six springs, i.e., conductive springs 7*a* to 7*f* for elastically biasing the camera contacts 6*a* to 6*f* in the contact direction, are housed in the camera contact base 5, and one side of the camera contact base 5 is closed by the printed circuit board 8. On the printed circuit board 8, a pattern is formed at positions corresponding to the springs 7*a* to 7*f*, so that the printed circuit board 8 can be electrically connected to the camera contacts 6*a* to 6*f* via the springs 7*a* to 7*f*.

On the lens contact base 13, six lens contacts 14*a* to 14*f* corresponding to the camera contacts 6*a* to 6*f* are fixed by insert molding.

The camera contacts 6a and 6f are associated with a power supply, i.e., the contact 6a is for ground, and the contact 6f is for high potential. The camera contacts 6b to 6e are associated with communications, and have a clock line, a camera→lens transmission line, and a lens→camera transmission line. Only the camera contact 6f (for high potential) has a different height from those of other camera contacts 6a to 6e in the contact direction (optical axis direction) by forming a step. In this state, as shown in FIG. 6 before mounting, only the camera contact 6f is supported with a different height at a position receded (on the imaging element side) in the optical axis direction O–O' (see FIG. 1). Also, only the springs 7a and 7f for biasing the camera contacts 6a and 6f associated with a power supply in the contact direction are set to have a larger biasing force than those of other springs 7b to 7e. This is to decrease the contact resistance by increasing the contact pressures between the contacts 6a and 6f, and the contacts 14a and 14f for a power supply as compared to those between the contacts 6b to 6e and 14b to 14e for communications when the camera contacts 6a to 6f are brought into contact with the lens contacts 14a to 14f.

In general, power supply contacts for, e.g., motors serving as power supplies and communication contacts have different allowable contact resistance limits. For example, if the allowable contact resistance of the power supply contacts is 0.1 Ω or less, the allowable contact resistance of the communication contacts is 1 Ω or less.

As can be seen from the state in the middle of mounting shown in FIG. 7, the protruding height of the camera contact 6f is set to be lower than those of other camera contacts 6a to 6e (to recede backward in the optical axis direction), so that the camera contact 6f with a different height does not slide relative to the non-corresponding lens contacts 14a to 14e during mounting pivotal motion of the mounts. On the other hand, the lens contact 14f corresponding to the camera contact 6f has its protruding height higher than those of other lens contacts 14a to 14e (to recede backward in the optical axis direction), so that the contact 14f can contact the camera contact 6f at the end of the mounting pivotal motion of the mounts. Note that corresponding ones (6a and 14a, 6b and 14b, 6c and 14c, 6d and 14d, and 6e and 14e) of the camera contacts 6a to 6e and the lens contacts 14a to 14e are brought into contact with each other at the end of the mounting pivotal motion of the mounts.

The mounting pivotal operation of the mounts will be described below. FIG. 6 shows the state before mounting. In this state, none of the camera contacts 6a to 6f and the lens contacts 14a to 14f contact each other.

When the exchangeable lens barrel 10 is pivoted from the state shown in FIG. 6 and the lens contact base 13 is moved in the direction of an arrow X to the position shown in FIG. 7, the camera contacts 6e and 6d ride on an inclined surface 13a of the lens contact base 13, and slide along the surface (the surface even with those of the contacts 14a to 14e) of the contact base 13.

FIG. 8 shows the complete state of the mounting pivotal motion of the mounts, i.e., a state wherein the exchangeable lens has been further pivoted from the state shown in FIG. 7 to move the lens contact base 13 in the direction of the arrow X. In this state, the lens contacts 14a to 14f respectively contact the corresponding camera contacts 6a to 6f.

Note that the camera contacts 6a to 6f are located at the positions, so that their centers respectively contact the centers of the corresponding lens contacts 14a to 14f. The width of the high-potential lens contact 14f for a power supply is set to be smaller than those of the communication lens contacts 14b to 14e, and the ground lens contact 14a for a power supply is set to be larger than those of the communication contacts 14b to 14e (the contacts 14b to 14e have the same width). With this setting state, in consideration of the state immediately before completion of the mounting pivotal motion of the mounts, the respective contacts are connected in the following order. The ground contacts 6a and 14a for a power supply are connected to each other first, the communication contacts 6b to 6e and 14b to 14e are then substantially simultaneously connected to each other, and finally, the high-potential contacts 6f and 14f for a power supply are connected to each other.

When such connecting order is set, problems of an operation error, an operation disabled state, and the like that may occur when the power supply contacts are connected before the communication contacts are connected can be prevented.

Since the pitch, α, between the contacts is set to be sufficiently larger than the width, β, of the lens contacts, one lens contact never short-circuit two adjacent camera contacts during the mounting pivotal motion of the mounts. Also, since the distance, γ, between the lens contacts is sufficiently larger than the width of the contact surface at the distal end of the camera contact with respect to the lens contact, one camera contact never short-circuits two adjacent lens contacts during the mounting pivotal motion of the mounts, thus assuring a trouble-free arrangement.

Finally, the mounting process of the respective contacts will be explained in detail below. In a phase in which the camera contact 6f opposes the lens contacts 14a to 14e, the contact 6f does not contact the contacts 14a to 14e (i.e., it does not slide thereon), and contacts the lens contact 14f after it rides on the inclined surface 13b of the lens contact base 13 at the end of the mounting pivotal motion. The camera contact 6e rides on the inclined surface 13a, slides on the lens contacts 14a to 14d, and finally is brought into contact with the corresponding lens contact 14e. Likewise, the camera contact 6d rides on the inclined surface 13a, slides on the lens contacts 14a to 14c, and is then brought into contact with the corresponding lens contact 14d. The camera contact 6c rides on the inclined surface 13a, slides on the lens contacts 14a and 14b, and is then brought into contact with the corresponding lens contact 14c. The camera contact 6b rides on the inclined surface 13a, slides on the lens contact 14a, and is then brought into contact with the corresponding lens contact 14b. Furthermore, the camera contact 6a rides on the inclined surface 13a, and is brought into contact with the corresponding lens contact 14a. In this case, since the contacts 6a and 6f having a higher contact pressure than those of other camera contacts slide only once on the corresponding lens contacts during the mounting pivotal motion of the mounts, the adverse influence as a result of setting a higher contact pressure to decrease the contact pressure of the contacts associated with a power supply can be eliminated. For example, since these contacts 6a and 6f do not slide on other contacts, e.g., the lens contacts 14b to 14e, a wear due to slide motion can be reduced. Also, since the camera contacts 6a and 6f associated with a power supply never contact the lens contacts 14b to 14e associated with communications during the mounting pivotal motion of the mounts, they do not electrically destroy the circuitry in the exchangeable lens barrel 10. In addition, the total number of sliding contacts (a sum total of sliding contacts of the respective contacts) can be reduced to reduce wears of the contacts. Furthermore, since the contacts 6a and 6f (14a and 14f) associated with a power supply are located at the two ends of the contact array and have different heights, probability of short-circuiting due to an approaching conductor is very low.

According to this embodiment, since the camera electrical connecting terminal is disposed at least at one side position, which recedes from the camera flange surface in the optical axis direction, in a direction which substantially agrees with the color separation axis direction of the color separation prism, the danger of short-circuiting by an inadvertent contact of, e.g., a coin can be greatly reduced even when the optical accessory is detached. Furthermore, although the camera electrical connecting terminal is disposed to recede from the flange surface in the optical axis direction, since the positional relationship between the terminal and the color separation prism is modified, the flange back can be consequently shortened, resulting in a compact, lightweight structure.

Since the color separation axis direction of the color separation prism agrees with the up-and-down direction of the camera body and the camera electrical connecting terminal is disposed at a lower position of the camera body, the space factor can be improved in consideration of the aspect ratio of the screen, thus attaining a further compact, lightweight structure.

The flange back can be further shortened since the camera electrical connecting terminal is disposed to substantially overlap one, which is located on the rear side in the optical axis direction, of the two imaging elements which are located on the extending line of the color separation axis direction of the color separation prism.

What is claimed is:

1. A video camera system comprising:
    a camera body having a camera electrical connecting terminal which performs at least a communication, a camera mount, a color separation prism, and a plurality of imaging devices; and
    an optical accessory having an accessory mount which is attachable/detachable to/from the camera mount of said camera body, and having an accessory electrical connecting terminal which is connected with the camera electrical connecting terminal when said optical accessory is attached,
    wherein the camera electrical connecting terminal is disposed behind a flange of said camera mount along an optical axis and in at least at one position in a color separating direction of the color separation prism.

2. A system according to claim 1, wherein the color separating direction of the color separation prism is an up-and-down direction of said camera body, and the camera electrical connecting terminal is disposed at a lower position of said camera body.

3. A system according to claim 1, wherein said color separation prism separates three colors and wherein three said imaging devices are disposed at positions corresponding respectively to the separated colors, and the camera electrical connecting terminal is disposed to substantially overlap one of the imaging devices in a direction of the optical axis.

4. A system according to claim 2, wherein said color separation prism separates three colors and wherein three said imaging devices are disposed at positions corresponding respectively to the separated colors, and the camera electrical connecting terminal is disposed to substantially overlap one of the imaging devices in a direction of the optical axis.

5. An optical accessory which is mountable on a camera body, which has a camera electrical connecting terminal which performs at least a communication, a camera mount, a color separation prism, and a plurality of imaging devices, and in which the camera electrical connecting terminal is disposed behind a flange of said camera mount along an optical axis and in at least at one position in a color separating direction of the color separation prism, said optical accessory comprising:
    an accessory mount which is attachable/detachable to/from the camera mount of said camera body, and having an accessory electrical connecting terminal which is connected with the camera electrical connecting terminal when said optical accessory is attached.

6. An optical accessory according to claim 5, wherein a color separating direction of the color separation prism is an up-and-down direction of the camera body, and the camera electrical connecting terminal is disposed at a lower position of the camera body.

7. An optical accessory according to claim 5, wherein said color separation prism separates three colors and wherein three said imaging devices are disposed at positions corresponding respectively to the separates colors, and the camera electrical connecting terminal is disposed to substantially overlap one of the imaging devices in a direction of the optical axis.

8. An optical accessory according to claim 6, wherein said color separation prism separates three colors separation prisms and wherein three said imaging devices are disposed at positions corresponding respectively to said separated colors, and the camera electrical connecting terminal is disposed to substantially overlap one of the imaging devices in a direction of the optical axis.

9. A camera body to/from which an optical accessory having an accessory mount and an accessory electrical connecting terminal is attachable/detachable, said camera body comprising:
    a camera electrical connecting terminal connected to said accessory electrical connecting terminal when said optical accessory is attached;
    a camera mount which is attachable/detachable to/from said accessory mount;
    a color separation prism; and
    a plurality of imaging devices,
    wherein said camera electrical connecting terminal is disposed behind a flange of said camera mount along an optical axis and in at least one position in a color separating direction of the color separation prism.

10. A camera body according to claim 9, wherein a color separating direction of the color separation prism is an up-and-down direction of said camera body, and the camera electrical connecting terminal is disposed at a lower position of said camera body.

11. A camera body according to claim 9, wherein said color separation prism separates three colors and wherein three said imaging devices are disposed at positions corresponding respectively to the separated colors, and the camera electrical connecting terminal is disposed to substantially overlap one of the imaging devices in a direction of the optical axis.

12. A camera body according to claim 10, wherein said color separation prism separates three colors and wherein three said imaging devices are disposed at positions corresponding respectively to the separated colors, and the camera electrical connecting terminal is disposed to substantially overlap one of the imaging devices in a direction of the optical axis.

* * * * *